United States Patent
Morikuni et al.

(10) Patent No.: US 11,443,758 B2
(45) Date of Patent: Sep. 13, 2022

(54) ANOMALOUS SOUND DETECTION WITH TIMBRE SEPARATION

(71) Applicant: INTERNATIONAL BUSINESS MACHINES CORPORATION, Armonk, NY (US)

(72) Inventors: Shu Morikuni, Koutouku (JP); Michiaki Tatsubori, Oiso (JP); Phongtharin Vinayavekhin, Bangkok (TH); Ryuki Tachibana, Setagaya (JP); Tadanobu Inoue, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 17/171,259

(22) Filed: Feb. 9, 2021

(65) Prior Publication Data
US 2022/0254366 A1 Aug. 11, 2022

(51) Int. Cl.
*G10L 25/51* (2013.01)
*G10L 25/30* (2013.01)
*G01M 99/00* (2011.01)
*G06N 3/04* (2006.01)
*G06N 3/08* (2006.01)

(52) U.S. Cl.
CPC ........... *G10L 25/51* (2013.01); *G01M 99/005* (2013.01); *G06N 3/0454* (2013.01); *G06N 3/088* (2013.01); *G10L 25/30* (2013.01)

(58) Field of Classification Search
CPC ...................................................... G10L 25/51
See application file for complete search history.

(56) References Cited

U.S. PATENT DOCUMENTS

| | | | |
|---|---|---|---|
| 2012/0185418 A1* | 7/2012 | Capman | G06N 20/00 706/12 |
| 2018/0264613 A1* | 9/2018 | Tamai | G06N 3/0454 |
| 2019/0120719 A1 | 4/2019 | Koizumi et al. | |
| 2020/0149998 A1* | 5/2020 | Ayyagari | G06N 3/088 |
| 2021/0256991 A1* | 8/2021 | Jun | G06N 3/0454 |
| 2021/0326728 A1* | 10/2021 | Kawachi | G06N 3/088 |
| 2021/0327456 A1* | 10/2021 | Yamaguchi | G05B 23/024 |
| 2021/0378597 A1* | 12/2021 | Amos | G06K 9/0051 |

(Continued)

OTHER PUBLICATIONS

Charu C. Aggarwal., "Outlier Analysis Second Edition", IBM T. J. Watson Research Center, Nov. 25, 2016, pp. 1-54.

(Continued)

*Primary Examiner* — Olisa Anwah
(74) *Attorney, Agent, or Firm* — Tutunjian & Bitetto, P.C.; Randall Bluestone

(57) ABSTRACT

Methods, systems, and computer program products for detecting anomalous behavior include reconstructing a waveform of a target device from an input waveform using a target autoencoder. A waveform of unrelated sound events is reconstructed from the input waveform using an environmental autoencoder. The input waveform is classified to determine that the input waveform is produced by anomalous behavior of the target device using a classifier, based on the reconstructed waveform of the target device and the reconstructed waveform of the unrelated sound events. An automatic response to the anomalous behavior is generated.

20 Claims, 7 Drawing Sheets

(56) References Cited

U.S. PATENT DOCUMENTS

2022/0129748 A1\* 4/2022 Shih ................ G06K 9/6215
2022/0155263 A1\* 5/2022 Inoue ................ G01N 29/14

OTHER PUBLICATIONS

Yuma Koizumi, et al., "Description and Discussion on DCASE2020 Challenge TASK2: Unsupervised Anomalous Sound Detection for Machine Condition Monitoring", Detection and Classification of Acoustic Scenes and Events 2020, arXiv:2006.05822v2 [eess.AS], Aug. 8, 2020, pp. 1-5.

Emad M. Grais, et al., "Single Channel Audio Source Separation Using Convolutional Denoising Autoencoders", Proceedings of the IEEE GlobalSIP Symposium on Sparse Signal Processing and Deep Learning, 5th IEEE Global Conference on Signal and Information Processing (GlobalSIP 2017), Nov. 2017, pp. 1-5.

Harsh Purohit, et al., "Mimii Dataset: Sound Dataset for Malfunctioning Industrial Machine Investigation and Inspection", Research and Development Group, Hitachi, Ltd., backarXiv: 1909.09347v1 [cs.SD], Sep. 20, 2019, pp. 1-5.

Yohei Kawaguchi, et al., "Anomaly Detection Based on an Ensemble of Dereverberation and Anomalous Sound Extraction", Research and Development Group, Hitachi, Ltd., 978-1-5386-4658-8 IEEE, May 12, 2019 pp. 865-869.

Yohei Kawaguchi., "Anomaly Detection Based on Feature Reconstruction from Subsampled Audio Signals", 26th European Signal Processing Conference (EUSIPCO), Sep. 3, 2018, pp. 2524-2528.

Yuma Koizumi, et al., "ToyADMOS: A Dataset of Miniature-Machine Operating Sounds for Anomalous Sound Detection", IEEE Workshop on Applications of Signal Processing to Audio and Acoustics, Oct. 2019, pp. 313-317.

Izhak Golan, et al., "Deep Anomaly Detection Using Geometric Transformations", 32nd Conference on Neural Information Processing Systems (NeurIPS 2018), May 28, 2018, pp. 1-12.

Dan Hendrycks, et al., "A Baseline for Detecting Misclassified and Out-of-Distribution Examples in Neural Networks", Published as a conference paper at ICLR 2017, arXiv:1610.02136v3 [cs.NE], Oct. 3, 2018, pp. 1-12.

Kaori Suefusa, et al., "Anomalous Sound Detection Based on Interpolation Deep Neural Network", Research and Development Group, Hitachi, Ltd., arXiv:2005 09234v1 [eess.AS], May 19, 2020, pp. 1-5.

Chong Zhou, et al., "Anomaly Detection with Robust Deep Autoencoders", KDD 2017 Research Paper, Aug. 2017, pp. 665-674.

Mell et al., "The NIST Definition of Cloud Computing", National Institute of Standards and Technology, Special Publication 800-145, Sep. 2011, pp. 1-7.

\* cited by examiner

ANOMALOUS SOUND DETECTION WITH TIMBRE SEPARATION

BACKGROUND

The present invention generally relates to anomalous sound detection, and, more particularly, to the separation of relevant anomalous sounds from irrelevant anomalous sounds.

Acoustic information may be used as an indicator of a machine's condition. While visual information may be helpful, such inspection is often only possible at the surface level. In contrast, an acoustic signal from the machine can provide insights about the machine's inner workings.

Anomaly detection may be performed using an unsupervised machine learning task, where a training dataset is provided to show the expected waveforms of normal operation. However, such a model may treat all anomalies or outliers the same, with little ability to distinguish between different types of anomalies.

SUMMARY

A computer program product for detecting anomalous behavior, the computer program product comprising a computer readable storage medium having program instructions embodied therewith. The program instructions are executable by a hardware processor to cause the hardware processor to reconstruct a waveform of a target device from an input waveform using a target autoencoder. A waveform of unrelated sound events is reconstructed from the input waveform using an environmental autoencoder. The input waveform is classified to determine that the input waveform is produced by anomalous behavior of the target device using a classifier, based on the reconstructed waveform of the target device and the reconstructed waveform of the unrelated sound events. An automatic response to the anomalous behavior.

A method for training an anomalous behavior classifier includes training a target autoencoder, using training data that represents normal operation of a target device, to generate a reconstructed target device waveform from a mixed input waveform. A first environmental autoencoder is trained, using training data that represents a first set of unrelated sound events, to generate a reconstructed unrelated waveform from a mixed input waveform. A neural network classifier is trained, using reconstructed target device waveforms and unrelated waveforms based on the training data, to generate an output that classifies whether an input waveform represents anomalous behavior of the target device.

A system for detecting anomalous behavior that includes a hardware processor and a memory. The memory stores computer program instructions, that are executable by the hardware processor to cause the hardware processor to reconstruct a waveform of a target device from an input waveform using a target autoencoder, to reconstruct a waveform of unrelated sound events from the input waveform using an environmental autoencoder, to classify the input waveform to determine that the input waveform is produced by anomalous behavior of the target device using a classifier, based on the reconstructed waveform of the target device and the reconstructed waveform of the unrelated sound events, and to generate an automatic response to the anomalous behavior.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

A target waveform may be emphasized among noise by using two types of autoencoders, including a target autoencoder and an environmental autoencoder. For example, if acoustic waveforms are being collected to monitor a particular machine, then the sounds of that machine may represent the target waveform, and background events may represent the noise. Whereas the target autoencoder may be trained on waveform signals that are related to normal operation of the machine, the environmental autoencoder may be trained on samples that include other signals, for example signals that are selectively chosen using knowledge of the environment and the types of sounds that may occur.

The reconstructed signals, generated by the respective autoencoders, may be used as auxiliary features that are combined with the original input signal, for example by concatenating the reconstructed signals with the original input signal. The combined feature signal may then be used to train a classifier or other machine learning model, for example to generate a final anomaly score that represents a likelihood that a particular input waveform indicates a relevant anomaly at the machine.

Figure 1:
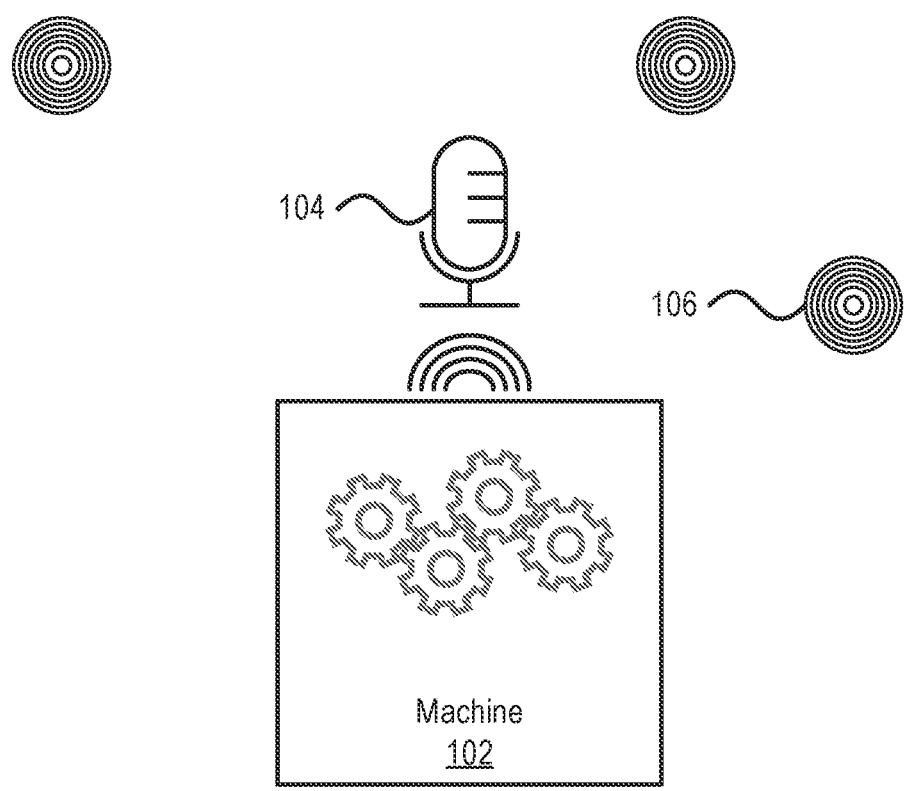
FIG. 1 is a diagram that shows a machine that is being monitored for abnormal behavior, in an environment with unrelated sounds, in accordance with an embodiment of the present invention.

Referring now to the drawings in which like numerals represent the same or similar elements and initially to FIG. 1, an exemplary acoustic environment is shown. The environment includes a machine 102, which generates sounds as part of its operation. These sounds may represent normal operation, where the machine 102 is operating within expected parameters, and may also represent abnormal operation, where the machine 102 is malfunctioning or is operating in some unexpected way.

Also present in the environment are various unrelated sound events 106. These unrelated sound events 106 may come from any source, including human operators, other machinery, closing doors, dropped objects, and any other occurrence, whether predictable or unpredictable. For example, in an environment that includes a workshop, such unrelated sound events 106 may include the sounds of a hammer, a saw, a fan, a drill, or any other type of expected activity or event that could reasonably be expected to occur in a workshop.

The sounds in the environment may be measured by one or more audio sensors 104, such as a microphone that measures pressure waves in air. The recorded sound information, for example represented as audio waveforms, may be used to identify whether the machine 102 is operating normally or abnormally. A set of training data may be created that includes a variety of waveforms, including sounds that represent the normal operation of the machine 102, as well as sounds that represent known types of unrelated sound events 106 that might be found in the environment. The waveform that is recorded at the audio sensor 104 may therefore include multiple different signals, overlapping in a single time series.

It should be understood that, although audio signals are specifically contemplated, other forms of inputs may be included. For example, radio signals may similarly be measured at an antenna, with signals from a source of interest may mix with signals from unrelated events. Other types of signals that may be used include, but are not limited to, pressure waves in media other than air, such as in water or in the earth.

A classifier may be used to make determinations about the operation of the machine 102. Such a classifier may be trained using the training data described above. Such a classifier may be trained using both the information that represents normal operation of the machine 102, as well as information that represents the unrelated sound events 106.

Figure 2:
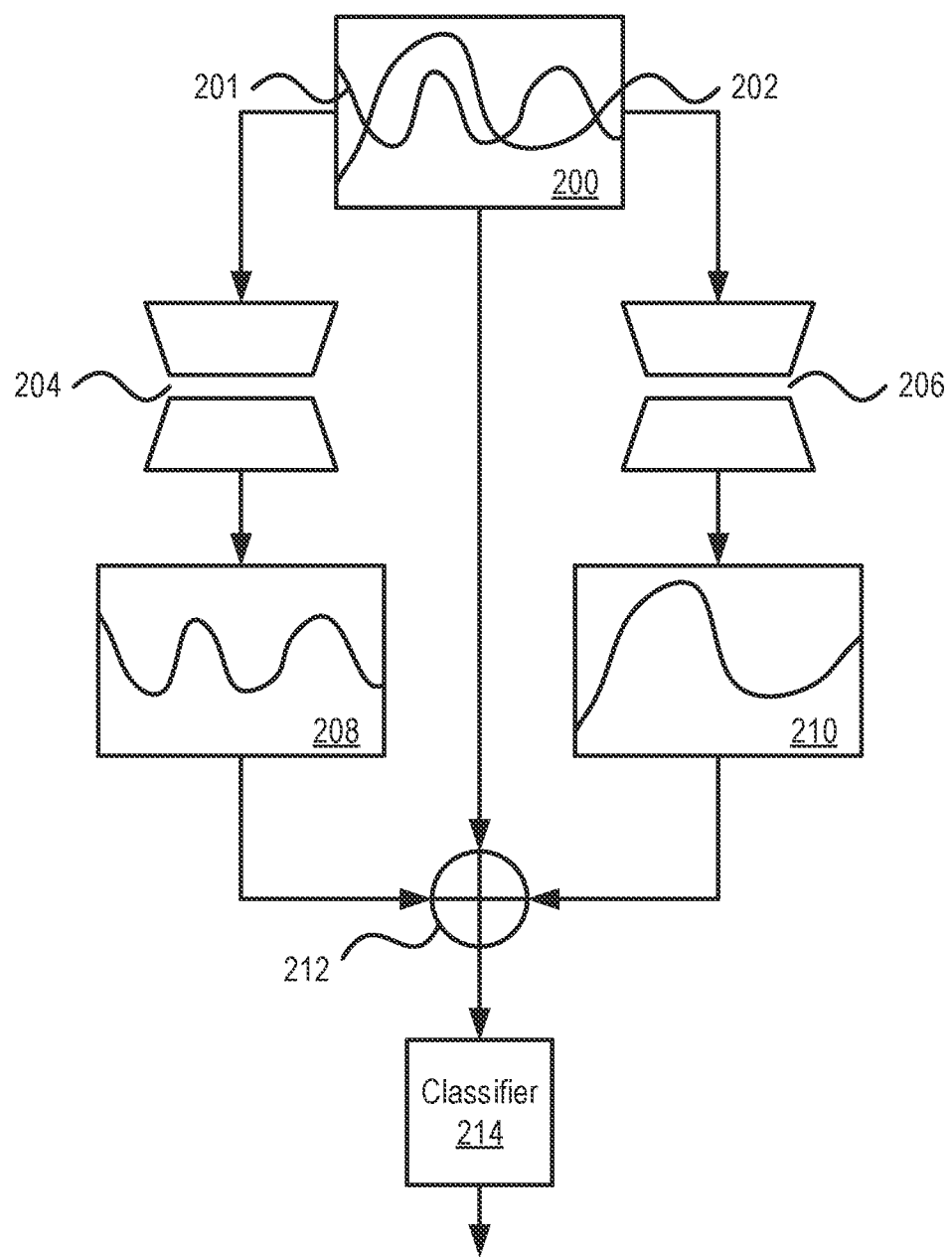
FIG. 2 is a block diagram that illustrates the structure of a neural network that classifies waveforms according to whether they represent abnormal behavior in a machine, in accordance with an embodiment of the present invention.

Referring now to FIG. 2, a diagram shows a classification task that includes a target autoencoder and an environmental autoencoder. While only these two autoencoders are shown, others may be included in parallel, using different architectures to generate auxiliary signals. An input signal waveform 200 includes a target waveform 201 and an unrelated waveform 202. These two waveforms are shown as overlapping, when in an actual measured waveform, they would interfere with one another, adding their respective amplitudes.

The input waveform 200 is introduced as input to a target autoencoder 204 and to an environmental autoencoder 206. The input waveform 200 may be input in its raw form, or converted into spectrogram features, in accordance with the autoencoder architecture. Autoencoder networks may include two sections: an encoder section and a decoder section. The encoder section may create a relatively low-dimensional embedding of a relatively high-dimensional input, while the decoder section may recreate the original high-dimensional input. The autoencoder network is trained to recreate the original input as closely as possible. Such networks may be used in various ways. For example, the low-dimensional embedding may be used as a relatively compact representation of the original input. The high-dimensional output, meanwhile, may be used to reconstruct information from a noisy input. Although autoencoder neural networks are specifically contemplated, it should be understood that any appropriate architecture may be used instead. These autoencoders may have any appropriate neural network architecture. In one specific and non-limiting example, each autoencoder may include a set of fully connected layers using a rectified linear unit (ReLU) activation function.

Each neuron in neural network may have a respective activation function. These activation functions represent an operation that is performed on the input of the neuron, and that help to generate the output of the neuron. Exemplary activation functions include the logistic function, the hyperbolic tangent, ReLU, softmax, and maxout, but any appropriate activation function may be used.

In particular, a ReLU activation function may be used. ReLU provides an output that is zero when the input is negative, and reproduces the input when the input is positive. The ReLU function notably is not differentiable at zero—to account for this during training, the undefined derivative at zero may be replaced with a value of zero or one.

Each autoencoder may be trained on a respective set of signals. For example, the target autoencoder 204 may be trained using training waveforms that represent normal operation of the machine 102, while the environmental autoencoder 206 may be trained using training waveforms that represent unrelated sound events 106 that are expected to occur within the environment. In some cases, the environmental autoencoder 206 may be trained using any signals other than the target signal, rather than solely those that are expected to occur within a specific environment. The output of each autoencoder is an approximate reconstruction of the respective part of the original input waveform 200. Thus, the target autoencoder 204 may output a reconstruction 208 of the target waveform 201, while the environmental autoencoder 206 may output a reconstruction 210 of the unrelated waveform 202.

The original waveform 200 may be combined with the reconstructed target waveform 208 and the reconstructed unrelated waveform 210 at combiner 212. The combiner 212 may perform any appropriate combination of the different signals, but it is specifically contemplated that a concatenation operation may be performed. Any combination of signals from the autoencoders may be used, depending on the problem setting and dataset characteristics. If additional environmental autoencoders are used, they may be selectively combined to reflect different environmental conditions.

A classifier 214 accepts the combined waveform as an input, and generates a classification score. For example, the classifier 214 may output a maximum softmax probability that represents a degree of confidence that the input waveform 200 represents anomalous behavior of the machine 102. For example, a score may be expressed as:

$$\text{score}(x) = 1 - y^j(\text{feat}(x))$$

where y is a convolutional neural network (CNN) model, j is an index that relates to one of multiple different machine types that the model may be trained to handle, and feat(x) is a combined feature vector from the autoencoder outputs and the original signal waveform.

CNNs process information using a sliding "window" across an input, with each neuron in a CNN layer having a respective "filter" that is applied at each window position. Each filter may be trained, for example, to handle a respective pattern within an input. Local relationships between different parts of the input may be captured by the filter as it passes through different regions of the data. The output of a neuron in a CNN layer may include a set of values, representing whether the respective filter matched each set of values in the sliding window.

In one specific and non-limiting example, the classifier 214 may include a set of CNN layers, each with batch normalization and a rectified linear unit activation function. The output of the last CNN layer may feed to a global max pooling layer with dropout regularization. A set of fully connected layers lead to a softmax output. The classifier's output may include classification results for each machine type and machine identifier that can be detected.

This neural network model may be implemented on-site, or may be performed in a distributed fashion, with different environmental autoencoders being trained for different respective conditions. It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 3:
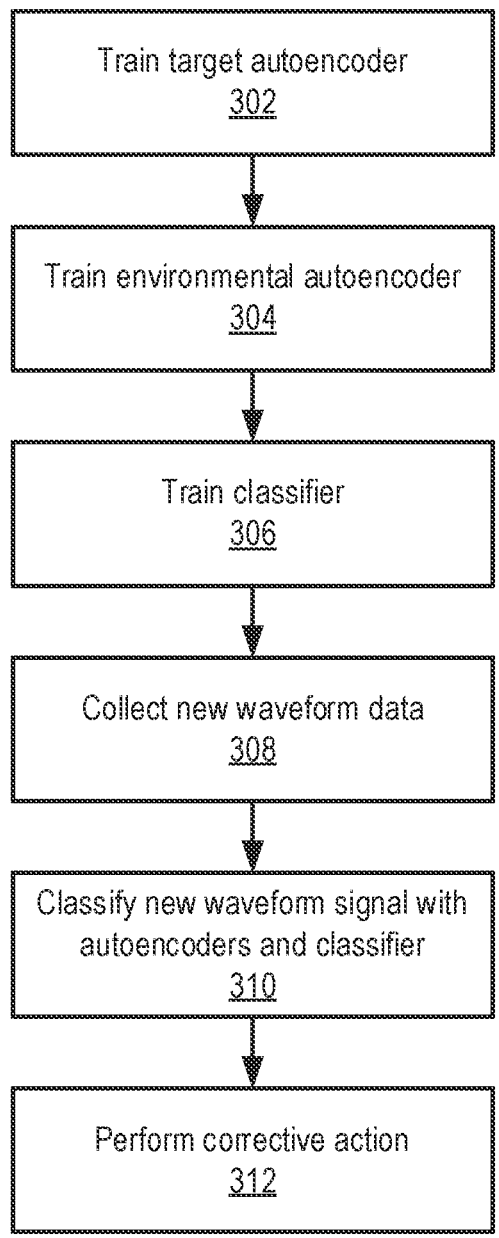
FIG. 3 is a block/flow diagram of a method for detecting and correcting abnormal behavior in a machine according to a detected waveform, in an environment with unrelated sounds, in accordance with an embodiment of the present invention.

Referring now to FIG. 3, a method of training and using a classifier for abnormal sound information is shown. Block 302 trains the target autoencoder 204 and block 304 trains the environmental autoencoder 206 using different training datasets. These training steps may be performed using predetermined waveforms that are known to represent sounds associated with normal operation of a machine 102 and that are known to represent expected unrelated sound events 106, respectively. The respective autoencoders are trained to reproduce the input training waveforms.

The autoencoders 204 and 206 may be trained using a mean squared error loss, where the reconstructed signal is compared to the training waveform. For example, a loss function for the target autoencoder 204 may be expressed as:

$$L_{target} = \sum_{n=1}^{N} \|x_{target}^n - D_{target}(E_{target}(x_{target}^n))\|_2^2$$

where $x_{target}^n$ is the $n^{th}$ segment of the target training waveform x, with dimensions (bin, frame), N is the number of segments in the target training waveform, $D_{target}$ is the operation of the decoder of the target autoencoder 204, and $E_{target}$ is the operation of the encoder of the target autoencoder 204. A loss function for the environmental autoencoder 206 may be expressed as:

$$L_{env} = \sum_{n=1}^{N} \|x_{env}^n - D_{env}(E_{env}(x_{env}^n))\|_2^2$$

where $x_{env}^n$ is $n^{th}$ segment of the environmental training waveform x, with dimensions (bin, frame), N is the number of segments in the environmental training waveform, $D_{env}$ is the operation of the decoder of the environmental autoencoder 206, and $E_{env}$ is the operation of the encoder of the environmental autoencoder 206.

Segments of the reconstructed signals may be concatenated to form a total reconstructed signal:

$$Aux_{env}(x) = concat(D_{env}(E_{env}(x^1)), \ldots, D_{env}(E_{env}(x^N)))$$

$$Aux_{tar}(x) = concat(D_{target}(E_{target}(x^1)), \ldots, D_{target}(E_{target}(x^N)))$$

where $Aux_{env}(x)$ is the auxiliary signal generated by the environmental autoencoder and $Aux_{tar}(x)$ is the auxiliary signal generated by the target autoencoder.

These "auxiliary" signals may be provided, along with the raw signal, to form various combinations of signals as input features feat(x) to a feature-learning-based classifier, for example by concatenating the selected raw and auxiliary signals in the channel dimension:

$$feat(x) = concat(x, Aux_{env}(x), Aux_{tar}(x))$$

Block 306 then trains the classifier 214 using signals that represent normal operation. During training of the classifier 214, the autoencoders may be fixed. The classifier model 214 may be trained by optimizing a cross-entropy loss, which classifies the machine types, as well as specific machine identifiers, of a given input waveform x.

The training dataset may include sound clips of particular sounds, such as sounds associated with normal operation of the machine 102 and with known unrelated sound events 106. These sound clips may be mixed with background environmental sounds from an environment that matches the environment in question, such as a workshop or factory. In some cases, pure-machine sound clips and unrelated sound event clips may be provided separately, while some datasets may provide combined sound clips.

Block 308 collects new waveform data, for example using the microphone 104 in the environment. As noted above, the new waveform data may include a variety of different waveforms, including sounds that indicate normal operation of the machine 102, abnormal operation of the machine, and unrelated sound events 106. This new waveform data characterizes the present state of the environment.

Block 310 then classifies the new waveform data using the autoencoders 204 and 206 and the classifier 214, as described above. The classifier 214 generates an output that represents a likelihood that the new waveform data represents an abnormality in the machine 102. The classifier 214 may classify according to multiple different classes, corresponding to different machine identifiers. These identifiers may correspond to different types of machine, or may correspond to specific machines. The output of the classifier 214 may therefore be a confidence value for each of these identifiers. This confidence value may indicate how likely the machine 102 is to be operating normally. The likelihood that the machine 102 is operating abnormally can be determined by subtracting the confidence score from 1.

Using this information, block 312 can perform a corrective action, for example if abnormal operation is indicated. The corrective action can include any appropriate response to an abnormal condition. For example, block 312 may alert a human operator to investigate and correct the abnormality. Block 312 may automatically respond to the abnormality, for example by automatically changing settings on the machine 102, by changing qualities of the environment (e.g., heating/cooling, humidity, lighting), or turning off the machine 102 or other nearby equipment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 4:
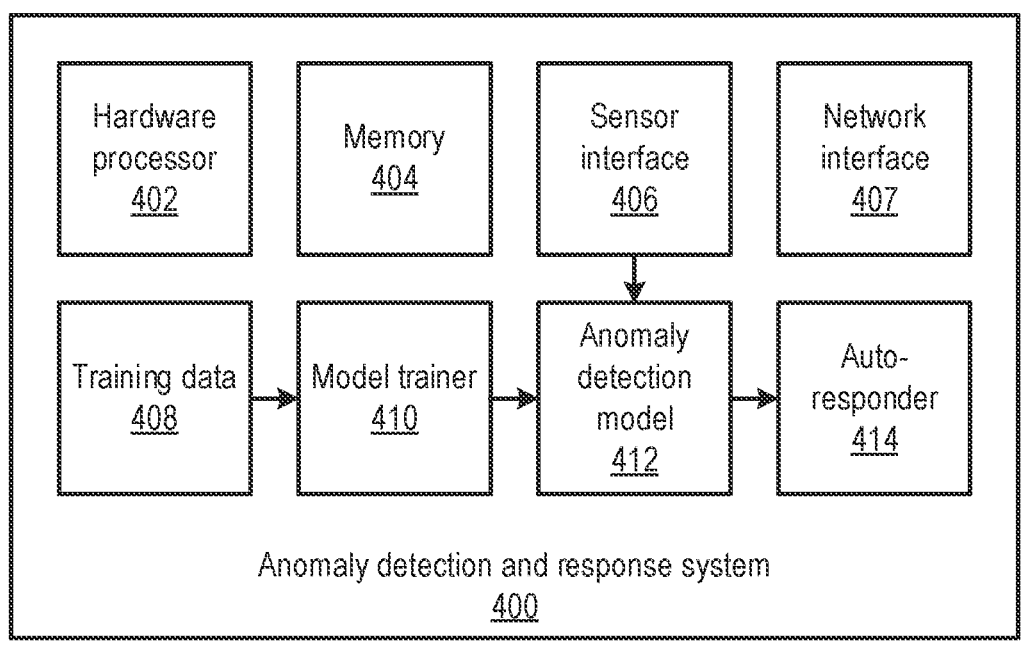
FIG. 4 is a block diagram of an anomaly detection and response system that detects and corrects abnormal behavior in a machine according to a detected waveform, in an environment with unrelated sounds, in accordance with an embodiment of the present invention.

Referring now to FIG. 4, an anomaly detection and response system 400 is shown. The system 400 includes a hardware processor 402 and a memory 404. A sensor interface 406 may receive information from the sensor(s) 104 by any appropriate wired or wireless communications medium and protocol. A network interface 407 may communicate with one or more devices in the environment, for example including one or more machines 102 and environmental controls. The sensor interface 406 may use the network interface 407, or may include one or more dedicated sensor inputs.

A model trainer 410 may train an anomaly detection model 412, for example using a set of training data 408 that may be stored in memory 404. In some cases, the anomaly detection model 412 may be trained in advance, such that the training data 408 and the model trainer 410 need not be implemented in the system 400.

As new waveform information is received by the sensor interface 406, the anomaly detection model 412 determines whether it represents anomalous or abnormal behavior. An auto-responder 414 automatically responds to abnormal behavior, for example by issuing commands to one or more devices in the environment using network interface 407.

As noted above, the anomaly detection model 412 may be implemented as an artificial neural network (ANN). An ANN is an information processing system that is inspired by biological nervous systems, such as the brain. One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 5:
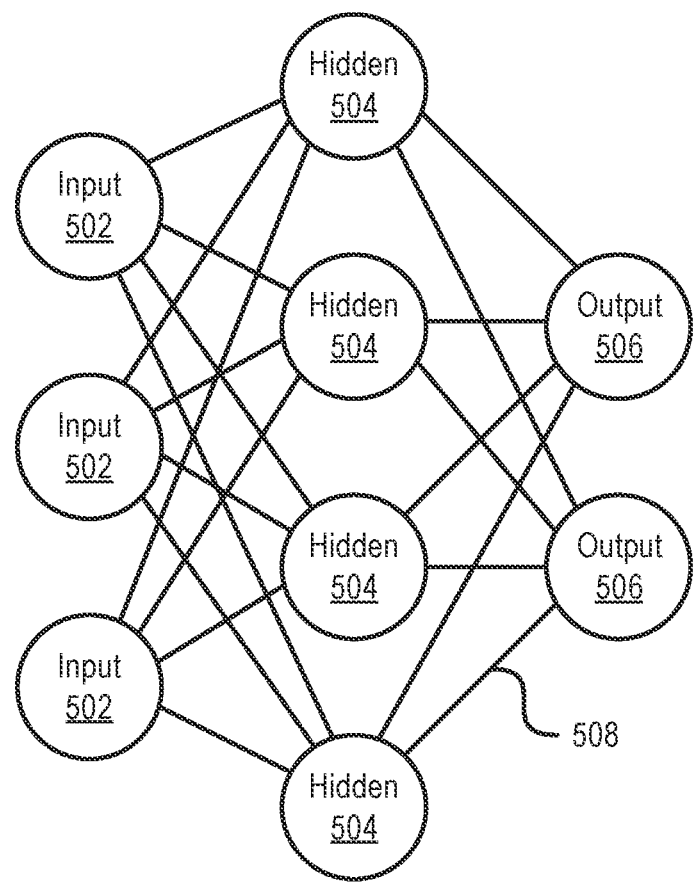
FIG. 5 is a diagram that illustrates a neural network architecture that may be used to implement one or more parts of a neural network model, in accordance with an embodiment of the present invention.

Referring now to FIG. 5, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 502 that provide information to one or more "hidden" neurons 504. Connections 508 between the input neurons 502 and hidden neurons 504 are weighted, and these weighted inputs are then processed by the hidden neurons 504 according to some function in the hidden neurons 504. There can be any number of layers of hidden neurons 504, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 506 accepts and processes weighted input from the last set of hidden neurons 504.

This represents a "feed-forward" computation, where information propagates from input neurons 502 to the output neurons 506. Upon completion of a feed-forward computation, the output is compared to a desired output available from training data. The error relative to the training data is then processed in "backpropagation" computation, where the hidden neurons 504 and input neurons 502 receive information regarding the error propagating backward from the output neurons 506. Once the backward error propagation has been completed, weight updates are performed, with the weighted connections 508 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 508 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 508 may be implemented as resistive processing units (RPUs), generating a predictable current output when an input voltage is applied in accordance with a settable resistance.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
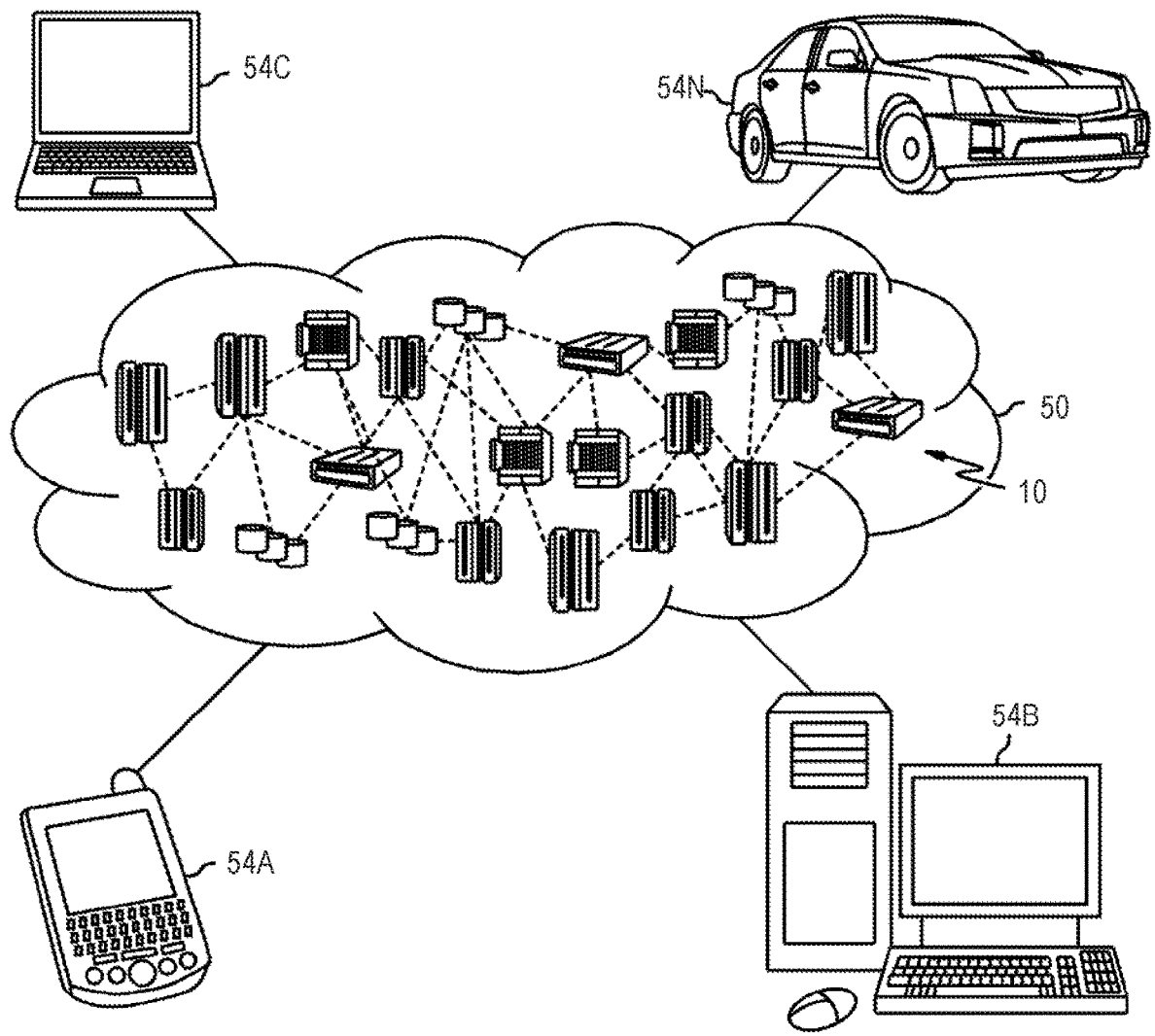
FIG. 6 is a diagram of a cloud computing environment according to the present principles.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 7:
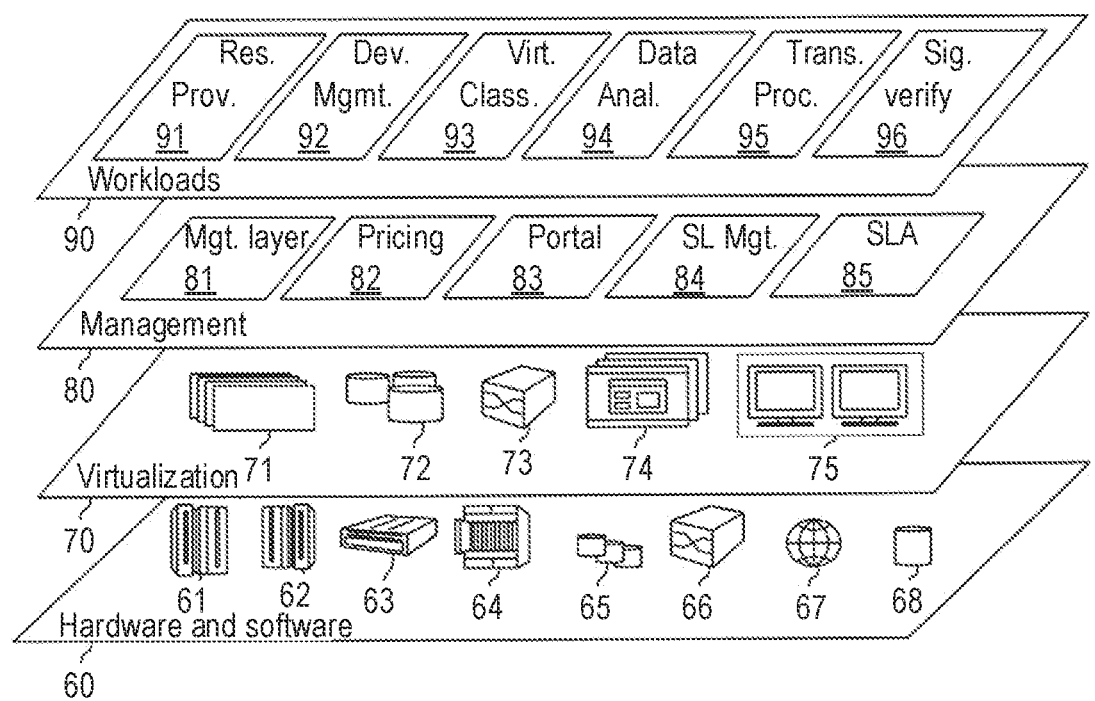
FIG. 7 is a diagram of abstraction model layers according to the present principles.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product for detecting anomalous behavior, the computer program product comprising a computer readable storage medium having program instructions embodied therewith, the program instructions being executable by a hardware processor to cause the hardware processor to:
   reconstruct a waveform of a target device from an input waveform using a target autoencoder;
   reconstruct a waveform of unrelated sound events from the input waveform using an environmental autoencoder;
   classify the input waveform to determine that the input waveform is produced by anomalous behavior of the target device using a classifier, based on the reconstructed waveform of the target device and the reconstructed waveform of the unrelated sound events; and
   generate an automatic response to the anomalous behavior.

2. The computer program product of claim 1, wherein the program instructions further cause the hardware processor to concatenate a current reconstructed waveform of the target device, a current reconstructed waveform of the unrelated sound events, and a current original waveform that is used to generate the current reconstructed waveforms to form a concatenated signal.

3. The computer program product of claim 2, wherein the classifier accepts the concatenated signal as an input.

4. The computer program product of claim 1, wherein the program instructions further cause the hardware processor to generate the input waveform using input from a sensor device in an environment that includes the target device.

5. The computer program product of claim 1, wherein the first environmental autoencoder is trained using sample waveforms of multiple different sounds, unrelated to operation of the target device.

6. The computer program product of claim 1, wherein the program instructions further cause the hardware processor to reconstruct a second waveform of unrelated sound events from the input waveform using at least one additional environmental autoencoder.

7. The computer program product of claim 6, wherein the program instructions further cause the hardware processor to combine a subset of the input waveform, the reconstructed waveform output of the target autoencoder, and reconstructed waveform outputs of the first environmental autoencoder and the at least one additional environmental autoencoder, to form a combined signal as input to the classifier.

8. The computer program product of claim 1, wherein the automatic response includes an action selected from the group consisting of changing settings on the target device, changing qualities of the environment, and turning off the target device or other nearby equipment.

9. A computer-implemented method for training an anomalous behavior classifier, comprising:
   training a target autoencoder, using training data that represents normal operation of a target device, to generate a reconstructed target device waveform from a mixed input waveform;
   training a first environmental autoencoder, using training data that represents a first set of unrelated sound events, to generate a reconstructed unrelated waveform from a mixed input waveform; and
   training a neural network classifier, using reconstructed target device waveforms and unrelated waveforms based on the training data, to generate an output that classifies whether an input waveform represents anomalous behavior of the target device.

10. The method of claim 9, wherein training the neural network classifier includes concatenating a reconstructed training waveform from the target autoencoder, a reconstructed environmental waveform of the first environmental autoencoder, and an original training waveform for use as a training input to the classifier.

11. The method of claim 9, wherein the first environmental autoencoder is trained using sample waveforms of multiple different sounds, unrelated to operation of the target device.

12. The method of claim 9, further comprising training at least one additional environmental autoencoder, using training data that represents respective sets of unrelated sound events, to generate a reconstructed unrelated waveform from a mixed input waveform.

13. A system for detecting anomalous behavior, comprising:
a hardware processor;
a memory that stores computer program instructions, the computer program instructions executable by the hardware processor to cause the hardware processor to:
reconstruct a waveform of a target device from an input waveform using a target autoencoder;
reconstruct a waveform of unrelated sound events from the input waveform using an environmental autoencoder;
classify the input waveform to determine that the input waveform is produced by anomalous behavior of the target device using a classifier, based on the reconstructed waveform of the target device and the reconstructed waveform of the unrelated sound events; and
generate an automatic response to the anomalous behavior.

14. The system of claim 13, wherein the computer program instructions are further executable by the hardware processor to cause the hardware processor to concatenate an output waveform of the target autoencoder current, an output waveform of the first autoencoder, and the input waveform.

15. The system of claim 14, wherein the classifier classifies the concatenated waveforms.

16. The system of claim 13, further comprising a sensor that generates the input waveform in an environment that includes the target device.

17. The system of claim 13, wherein the first environmental autoencoder is trained using sample waveforms of multiple different sounds, unrelated to operation of the target device.

18. The system of claim 13, wherein the computer program instructions are further executable by the hardware processor to cause the hardware processor to reconstruct waveforms of unrelated sound events using an additional environmental autoencoder.

19. The system of claim 18, wherein the computer program instructions are further executable by the hardware processor to cause the hardware processor to combine a subset of the input waveform, a reconstructed waveform output of the target autoencoder, and reconstructed waveform outputs of the first environmental autoencoder and the at least one additional environmental autoencoder.

20. The system of claim 13, wherein the computer program instructions are further executable by the hardware processor to cause the hardware processor to perform an action selected from the group consisting of changing settings on the target device, changing qualities of the environment, and turning off the target device or other nearby equipment.

* * * * *